US006350807B1

United States Patent
Blok et al.

(10) Patent No.: US 6,350,807 B1
(45) Date of Patent: Feb. 26, 2002

(54) SILICA-REINFORCED TIRE TREAD RUBBER

(75) Inventors: Edward John Blok, Wadsworth; Paul Harry Sandstrom, Tallmadge; Wen-Liang Hsu, Cuyahoga Falls; Adel Farhan Halasa, Bath; John Joseph Andre Verthe, Kent; Raymond Robert DiRossi, Akron, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/616,270

(22) Filed: Jul. 14, 2000

Related U.S. Application Data

(60) Provisional application No. 60/149,609, filed on Aug. 18, 1999.

(51) Int. Cl.$^7$ ................................................. C08K 3/34
(52) U.S. Cl. ..................................... 524/493; 152/209.5
(58) Field of Search ........................ 524/493; 152/209.5

(56) References Cited

U.S. PATENT DOCUMENTS 5,159,020 A * 10/1992 Halasa ....................... 525/237
5,994,448 A * 11/1999 Blok ........................... 524/492

* cited by examiner

Primary Examiner—Paul R. Michl
(74) Attorney, Agent, or Firm—Alvin T. Rockhill

(57) ABSTRACT

The present invention relates to a tire tread compound that is highly loaded with silica. This compound offers the advantages of silica compounding without the need for solution SBR. More specifically, the tire tread rubber formulations of this invention offer an excellent combination of traction, treadwear and rolling resistance characteristics. The subject invention discloses a tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; wherein the tread is comprised of (1) 5 phr to 40 phr of a polyisoprene rubber selected from the group consisting of natural rubber and synthetic polyisoprene, (2) 20 phr to 60 phr of high vinyl polybutadiene rubber having a glass transition temperature which is within the range of −40° C. to 10° C., (3) 20 phr to 60 phr of tin-coupled isoprene-butadiene rubber having a glass transition temperature which is within the range of −90° C. to −70° C., (4) 30 phr to 90 phr of silica, (5) 5 phr to 50 phr of carbon black, (6) 2 phr to 50 phr of processing oil and (7) 0.5 phr to 15 phr of a silica coupling agent.

20 Claims, No Drawings

SILICA-REINFORCED TIRE TREAD RUBBER

This application claims the benefit of United States Provisional Application Serial No. 60/149,609 filed on Aug. 18, 1999.

BACKGROUND OF THE INVENTION

It is highly desirable for tires to exhibit good traction characteristics on both dry and wet surfaces. However, it has traditionally been very difficult to improve the traction characteristics of a tire without compromising its rolling resistance and tread wear. Low rolling resistance is important because good fuel economy is virtually always an important consideration. Good tread wear is also an important consideration because it is generally the most important factor which determines the life of the tire.

The traction, tread wear and rolling resistance of a tire is dependent to a large extent on the dynamic viscoelastic properties of the elastomers utilized in making the tire tread. In order to reduce the rolling resistance of a tire, rubbers having a high rebound have traditionally been utilized in making the tire's tread. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubber material for automobile tire treads. However, such blends are not totally satisfactory for all purposes.

The inclusion of styrene-butadiene rubber (SBR) in tire tread formulations can significantly improve the traction characteristics of tires made therewith. However, styrene is a relatively expensive monomer and the inclusion of SBR in tire tread formulations leads to increased costs.

Carbon black is generally included in rubber compositions which are employed in making tires and most other rubber articles. It is desirable to attain the best possible dispersion of the carbon black throughout the rubber to attain optimized properties. It is also highly desirable to improve the interaction between the carbon black and the rubber. By improving the affinity of the rubber compound to the carbon black, physical properties can be improved. Silica can also be included in tire tread formulations to improve rolling resistance.

U.S. Pat. No. 4,843,120 discloses that tires having improved performance characteristics can be prepared by utilizing rubbery polymers having multiple glass transition temperatures as the tread rubber. These rubbery polymers having multiple glass transition temperatures exhibit a first glass transition temperature which is within the range of about −110° C. to −20° C. and exhibit a second glass transition temperature which is within the range of about −50° C. to 0° C. According to U.S. Pat. No. 4,843,120, these polymers are made by polymerizing at least one conjugated diolefin monomer in a first reaction zone at a temperature and under conditions sufficient to produce a first polymeric segment having a glass transition temperature which is between −110° C. and −20° C. and subsequently continuing said polymerization in a second reaction zone at a temperature and under conditions sufficient to produce a second polymeric segment having a glass transition temperature which is between −20° C. and 20° C. Such polymerizations are normally catalyzed with an organolithium catalyst and are normally carried out in an inert organic solvent.

U.S. Pat. No. 5,137,998 discloses a process for preparing a rubbery terpolymer of styrene, isoprene and butadiene having multiple glass transition temperatures and having an excellent combination of properties for use in making tire treads which comprises: terpolymerizing styrene, isoprene and 1,3-butadiene in an organic solvent at a temperature of no more than about 40° C. in the presence of (a) at least one member selected from the group consisting of tripiperidino phosphine oxide and alkali metal alkoxides and (b) an organolithium compound.

U.S. Pat. No. 5,047,483 discloses a pneumatic tire having an outer circumferential tread where said tread is a sulfur-cured rubber composition comprised of, based on 100 parts by weight rubber (phr), (A) about 10 to about 90 parts by weight of a styrene-isoprene-butadiene terpolymer rubber (SIBR) and (B) about 70 to about 30 weight percent of at least one of cis 1,4-polyisoprene rubber and cis 1,4-polybutadiene rubber wherein said SIBR rubber is comprised of (1) about 10 to about 35 weight percent bound styrene, (2) about 30 to about 50 weight percent bound isoprene and (3) about 30 to about 40 weight percent bound butadiene and is characterized by having a single glass transition temperature (Tg) which is in the range of about −10° C. to about −40° C. and, further, the said bound butadiene structure contains about 30 to about 40 percent 1,2-vinyl units, the said bound isoprene structure contains about 10 to about 30 percent 3,4-units and the sum of the percent 1,2-vinyl units of the bound butadiene and the percent 3,4-units of the bound isoprene is in the range of about 40 to about 70 percent.

U.S. Pat. No. 5,272,220 discloses a styrene-isoprene-butadiene rubber which is particularly valuable for use in making truck tire treads which exhibit improved rolling resistance and tread wear characteristics, said rubber being comprised of repeat units which are derived from about 5 weight percent to about 20 weight percent styrene, from about 7 weight percent to about 35 weight percent isoprene and from about 55 weight percent to about 88 weight percent 1,3-butadiene, wherein the repeat units derived from styrene, isoprene and 1,3-butadiene are in essentially random order, wherein from about 25 percent to about 40 percent of the repeat units derived from the 1,3-butadiene are of the cis-microstructure, wherein from about 40 percent to about 60 percent of the repeat units derived from the 1,3-butadiene are of the trans-microstructure, wherein from about 5 percent to about 25 percent of the repeat units derived from the 1,3-butadiene are of the vinyl-microstructure, wherein from about 75 percent to about 90 percent of the repeat units derived from the isoprene are of the 1,4-microstructure, wherein from about 10 percent to about 25 percent of the repeat units derived from the isoprene are of the 3,4-microstructure, wherein the rubber has a glass transition temperature which is within the range of about −90° C. to about −70° C., wherein the rubber has a number average molecular weight which is within the range of about 150,000 to about 400,000, wherein the rubber has a weight average molecular weight of about 300,000 to about 800,000 and wherein the rubber has an inhomogeneity which is within the range of about 0.5 to about 1.5.

U.S. Pat. No. 5,239,009 reveals a process for preparing a rubbery polymer which comprises: (a) polymerizing a conjugated diene monomer with a lithium initiator in the substantial absence of polar modifiers at a temperature which is within the range of about 5° C. to about 100° C. to produce a living polydiene segment having a number average molecular weight which is within the range of about 25,000 to about 350,000; and (b) utilizing the living polydiene segment to initiate the terpolymerization of 1,3-butadiene, isoprene and styrene, wherein the terpolymerization is conducted in the presence of at least one polar modifier at a temperature which is within the range of about 5° C. to about 70° C. to produce a final segment which is comprised of repeat units which are derived from 1,3-butadiene, isoprene and styrene, wherein the final segment has a number average molecular weight which is within the range of about 25,000 to about 350,000. The rubbery polymer made by this process is reported to be useful for improving the wet skid resistance and traction characteristics of tires without sacrificing tread wear or rolling resistance.

U.S. Pat. No. 5,061,765 discloses isoprene-butadiene copolymers having high vinyl contents which can reportedly be employed in building tires which have improved traction, rolling resistance and abrasion resistance. These high vinyl isoprene-butadiene rubbers are synthesized by copolymerizing 1,3-butadiene monomer and isoprene monomer in an organic solvent at a temperature which is within the range of about −10° C. to about 100° C. in the presence of a catalyst system which is comprised of (a) an organoiron compound, (b) an organoaluminum compound, (c) a chelating aromatic amine and (d) a protonic compound; wherein the molar ratio of the chelating amine to the organoiron compound is within the range of about 0.1:1 to about 1:1, wherein the molar ratio of the organoaluminum compound to the organoiron compound is within the range of about 5:1 to about 200:1 and herein the molar ratio of the protonic compound to the organoaluminum compound is within the range of about 0.001:1 to about 0.2:1.

U.S. Pat. No. 5,405,927 discloses an isoprene-butadiene rubber which is particularly valuable for use in making truck tire treads, said rubber being comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3 percent to about 10 percent of the repeat units in said rubber are 1,2-polybutadiene units, wherein from about 50 percent to about 70 percent of the repeat units in said rubber are 1,4-polybutadiene units, wherein from about 1 percent to about 4 percent of the repeat units in said rubber are 3,4-polyisoprene units, wherein from about 25 percent to about 40 percent of the repeat units in the polymer are 1,4-polyisoprene units, wherein the rubber has a glass transition temperature which is within the range of about −90° C. to about −75° C. and wherein the rubber has a Mooney viscosity which is within the range of about 55 to about 140.

U.S. Pat. No. 5,654,384 discloses a process for preparing high vinyl polybutadiene rubber which comprises polymerizing 1,3-butadiene monomer with a lithium initiator at a temperature which is within the range of about 5° C. to about 100° C. in the presence of a sodium alkoxide and a polar modifier, wherein the molar ratio of the sodium alkoxide to the polar modifier is within the range of about 0.1:1 to about 10:1; and wherein the molar ratio of the sodium alkoxide to the lithium initiator is within the range of about 0.05:1 to about 10:1. By utilizing a combination of sodium alkoxide and a conventional polar modifier, such as an amine or an ether, the rate of polymerization initiated with organolithium compounds can be greatly increased with the glass transition temperature of the polymer produced also being substantially increased. The rubbers synthesized using such catalyst systems also exhibit excellent traction properties when compounded into tire tread formulations. This is attributable to the unique macrostructure (random branching) of the rubbers made with such catalyst systems.

U.S. Pat. No. 5,620,939, U.S. Pat. No. 5,627,237 and U.S. Pat. No. 5,677,402 also disclose the use of sodium salts of saturated aliphatic alcohols as modifiers for lithium-initiated solution polymerizations. Sodium t-amylate is reported to be a preferred sodium alkoxide by virtue of its exceptional solubility in non-polar aliphatic hydrocarbon solvents, such as hexane, which are employed as the medium for such solution polymerizations.

Numerous solutions have been proposed in order to decrease the rolling resistance of tires, in particular, by modifying the rubber compositions used for the treads of the tires. Thus, for rubber compositions which are reinforced with carbon black, it was initially proposed to reduce the content of carbon black. For instance, U.S. Pat. No. 4,822,844 proposes to use carbon black having specific characteristics expressed by a specific iodine absorption surface (IA) and nitrogen absorption surface ($N_2SA$), as well as by an average size of well-defined carbon particles. Another solution described in U.S. Pat. No. 4,866,131 proposes a tire tread composition which is comprised of a low molecular weight copolymer of butadiene and styrene (SBR) prepared in solution in mixture with another conventional copolymer prepared in solution or emulsion. U.S. Pat. No. 4,894,420 proposes to use a tread formed of a blend of cis 1,4-polyisoprene and a diene/acrylonitrile copolymer. However, none of the solutions proposed up to now have proven to be totally satisfactory since the improvement in the rolling resistance is accompanied by a decrease in one or more essential properties, such as the reduction of adherence on wet and/or snow-covered surfaces or a reduction in the resistance to wear. It has also been proposed to use white fillers, such as silica, bentonite, clay, titanium oxide, talc, and the like, as reinforcing fillers. Such white fillers have the advantage of not being obtained from petroleum and decreasing the rolling resistance of tire treads manufactured therewith. However, in view of the resultant decline in the properties, in particular the decline in the resistance to wear, the use of silica in tread compositions is still an exception and frequently represented only a minority fraction of the total filler as described in U.S. Pat. No. 4,894,420 and U.S. Pat. No. 4,820,751. In order to remedy this situation, European Patent Application 299,074 proposes a rubber composition comprising silica, as reinforcing filler, in very large proportions and which is based on a polymer which is functionalized by means of a special alkoxy silane compound having a non-hydrolyzable alkoxy group. However, this solution is restrictive in that it permits the use only of a very specific family of silanes, which constitutes a handicap for industrial use.

U.S. Pat. No. 5,227,425 discloses a sulfur-vulcanizable rubber composition obtained by thermomechanical working of a conjugated diene compound and an aromatic vinyl compound prepared by solution polymerization in a hydrocarbon solvent having a total content of aromatic vinyl compound of between 5 percent and 50 percent and a glass transition temperature (Tg) of between 0° C. and −80° C. with 30 to 150 parts by weight per 100 parts by weight of elastomer of a silica having a BET surface area of between 100 and 250 $m^2/g$, a CTAB surface area of between 100 and 250 $m^2/g$, an oil absorption measured in DBP of between 150 and 250 ml/100 g and an average projected area of the aggregates greater than 8500 $nm^2$ before use and between 7000 and 8400 $nm^2$ after thermomechanical mixing as well as the additives conventionally employed, with the exception of the sulfur vulcanization system, comprising at least one heat step reaching a temperature of between 130° C. and 180° C. for a suitable period of time of between 10 seconds and 20 minutes which is a function of the temperature selected in order to carry out the mechanical work and of the nature and volume of the components subjected to the mechanical work, followed by a finishing step consisting of the incorporating of the vulcanization system by mechanical work at a temperature below the vulcanization temperature. However, it is essential to utilize a rubbery polymer containing a vinyl aromatic monomer made by solution polymerization, such as solution SBR, in such tire tread compositions.

SUMMARY OF THE INVENTION

The present invention relates to a tire tread compound that is highly loaded with silica. This compound offers the advantages of silica compounding without the need for solution SBR. More specifically, the tire tread rubber formulations of this invention offer an excellent combination of traction, treadwear and rolling resistance characteristics. The highly silica-loaded tread rubber formulations of this invention are comprised of (1) a polyisoprene rubber selected from the group consisting of natural rubber and synthetic polyisoprene, (2) high vinyl polybutadiene rubber and (3) tin-coupled isoprene-butadiene rubber.

The present invention reveals a rubber formulation which is comprised of (1) 5 phr to 40 phr of a polyisoprene rubber selected from the group consisting of natural rubber and synthetic polyisoprene, (2) 20 phr to 60 phr of high vinyl polybutadiene rubber having a glass transition temperature which is within the range of −40° C. to 10° C., (3) 20 phr to 60 phr of tin-coupled isoprene-butadiene rubber having a glass transition temperature which is within the range of −90° C. to −70° C., (4) 30 phr to 90 phr of silica, (5) 5 phr to 50 phr of carbon black, (6) 2 phr to 50 phr of processing oil and (7) 0.5 phr to 15 phr of a silica coupling agent.

The subject invention further discloses a tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; wherein the tread is comprised of (1) 5 phr to 40 phr of a polyisoprene rubber selected from the group consisting of natural rubber and synthetic polyisoprene, (2) 20 phr to 60 phr of high vinyl polybutadiene rubber having a glass transition temperature which is within the range of −40° C. to 10° C., (3) 20 phr to 60 phr of tin-coupled isoprene-butadiene rubber having a glass transition temperature which is within the range of −90° C. to −70° C., (4) 30 phr to 90 phr of silica, (5) 5 phr to 50 phr of carbon black, (6) 2 phr to 50 phr of processing oil and (7) 0.5 phr to 15 phr of a silica coupling agent.

DETAILED DESCRIPTION OF THE INVENTION

The tire tread formulations of this invention are made by blending (1) 5 phr (parts by weight per 100 parts by weight of rubber) to 40 phr of a polyisoprene rubber selected from the group consisting of natural rubber and synthetic polyisoprene, (2) 20 phr to 60 phr of high vinyl polybutadiene rubber having a glass transition temperature which is within the range of −40° C. to 10° C., (3) 20 phr to 60 phr of tin-coupled isoprene-butadiene rubber having a glass transition temperature which is within the range of −90° C. to −70° C., (4) 30 phr to 90 phr of silica, (5) 5 phr to 50 phr of carbon black, (6) 2 phr to 50 phr of processing oil and (7) 0.5 phr to 15 phr of a silica coupling agent. The tire tread formulations of this invention will normally contain 10 phr to 30 phr of the polyisoprene rubber, 30 phr to 50 phr of the high vinyl polybutadiene rubber and 30 phr to 50 phr of the tin-coupled isoprene-butadiene rubber. It is normally preferred for the tire tread formulations of this invention will normally contain 15 phr to 20 phr of the polyisoprene rubber, 35 phr to 45 phr of the high vinyl polybutadiene rubber, and 35 phr to 45 phr of the tin coupled isoprene-butadiene rubber.

The rubber blends of this invention can be compounded utilizing conventional ingredients and standard techniques. For instance, the tread rubber blends of this invention will typically be mixed with sulfur, accelerators, waxes, scorch inhibiting agents and processing aids. In most cases, the tread rubber blends will be compounded with sulfur and/or a sulfur containing compound, at least one accelerator, at least one antidegradant, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Silica and carbon black will both be included as fillers in the tread formulations of this invention. From 30 phr to 90 phr of silica will be included in the blend. At high silica loading, it is only necessary to include a small amount of carbon black in the blend to give the tire a traditional black color. For instance, at high silica loadings, it is only necessary to include about 5 phr of carbon black in the rubber compound. Normally, from 40 phr to 80 phr of silica will be included in the blend to attain the desired tire performance characteristics. In most cases, it is preferred to include 50 phr to 75 phr of silica in the tread rubber compound. The amount of carbon black included in the blend will typically be within the range of 5 phr to 50 phr. In cases where at least 40 phr of silica are included in the blend, it will be desirable to limit the amount of carbon black in the blend to no more than 20 phr. In cases where at least 50 phr of silica are included in the blend, it will be desirable to limit the amount of carbon black in the blend to no more than 10 phr. Clays and/or talc can be included in the filler to reduce cost.

The blend will also normally include from 0.1 to 2.5 phr of at least one accelerator with 0.2 to 1.5 phr being preferred. Antidegradants, such as antioxidants and antiozonants, will generally be included in the tread compound blend in amounts ranging from 0.25 to 10 phr with amounts in the range of 1 to 5 phr being preferred. Processing oils will be included in the blend in amounts ranging from 2 to 50 phr with amounts ranging from 5 to 20 phr being preferred. The tread rubber blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers and 0 to 1 phr of scorch inhibiting agents.

To fully realize the advantages of the tread rubber formulations of this invention, it is critical to include a silica coupling agent therein. More specifically, the processing of the tread rubber compound is conducted in the presence of a sulfur containing organosilicon compound to realize maximum benefits. Examples of suitable sulfur containing organosilicon compounds are of the formula:

$$Z-Alk-S_n-Alk-Z \qquad (I)$$

in which Z is selected from the group consisting of

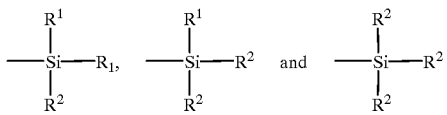

where $R^1$ is an alkyl group of 1 to 4 carbon atoms, cyclohexyl or phenyl; wherein $R^2$ is alkoxy of 1 to 8 carbon atoms, or cycloalkoxy of 5 to 8 carbon atoms; and wherein Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxysilylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis (methyl dimethoxysilylethyl) trisulfide, 2,2'-bis(methyl ethoxypropoxysilylethyl) tetrasulfide, 3,3'-bis (diethyl methoxysilylpropyl) tetrasulfide, 3,3'-bis,(ethyl di-sec.butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide and 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compound is 3,3'-bis(triethoxysilylpropyl) tetrasulfide. Therefore, as to Formula I, preferably Z is

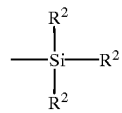

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur containing organosilicon compound of Formula I in a rubber composition will vary depending on the level of silica that is used. Generally speaking, the amount of the compound of Formula I will range from about 0.01 to about 1.0 parts by weight per part by weight of the silica. Preferably, the amount will range from about 0.02 to about 0.4 parts by weight per part by weight of the silica. More preferably, the amount of the compound of Formula I will range from about 0.05 to about 0.25 parts by weight per part by weight of the silica.

It is to be appreciated that the silica coupler may be used in conjunction with a carbon black; namely, pre-mixed with a carbon black prior to addition to the rubber composition, and such carbon black is to be included in the aforesaid amount of carbon black for the rubber composition formulation. In any case, the total quantity of silica and carbon black will be at least about 30 phr. The combined weight of the silica and carbon black may be as low as about 30 phr but is preferably from about 45 to about 130 phr.

The commonly employed siliceous pigments used in rubber compounding applications can be used as the silica. For instance, the silica can include pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3.

Tire tread formulations which include silica and an organosilicon compound will typically be mixed utilizing a thermomechanical mixing technique. The mixing of the tire tread rubber formulation can be accomplished by methods known to those having skill in the rubber mixing art. For example, the ingredients are typically mixed in at least two stages; namely, at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica and sulfur containing organosilicon, and carbon black if used, are mixed in one or more non-productive mix stages. The terms "non-productive" and "productive" mix stages are well known to those having skill in the rubber mixing art. The sulfur vulcanizable rubber composition containing the sulfur containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

Tire tread compounds made using the tread rubber compounds of this invention can be used in tire treads in conjunction with ordinary tire manufacturing techniques. Tires are built utilizing standard procedures with the rubber compounds of this invention simply being substituted for the rubber compounds typically used as the tread rubber. After the tire has been built with the rubber compounds of this invention, it can be vulcanized using a normal tire cure cycle. Tires made in accordance with this invention can be cured over a wide temperature range. However, it is generally preferred for the tires to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires to have a duration of about 10 to about 20 minutes with a cure cycle of about 12 to about 18 minutes being most preferred.

Synthesis of the High Vinyl Polybutadiene Rubber

U.S. Pat. No. 6,140,4.34 discloses a process for preparing high vinyl polybutadiene rubber that can be utilized in the tire tread rubber formulations of this invention. The teachings of U.S. Pat. No. 6,140,434 are incorporated herein by reference in their entirety. The technique disclosed therein involves polymerizing 1,3-butadiene monomer with a lithium initiator at a temperature which is within the range of about 5° C. to about 100° C. in the presence of a metal salt of a cyclic alcohol and a polar modifier, wherein te molar ratio of the metal salt of the cyclic alcohol to the polar modifier is within the range of about 0.1:1 to about 10:1; and wherein the molar ratio of the metal salt of the cyclic alcohol to the lithium initiator is within the range of about 0.05:1 to about 10:1.

The polymerization used in synthesizing the high vinyl polybutadiene rubber is normally carried out as a solution polymerization in an inert organic medium utilizing a lithium catalyst. However, metal salts of cyclic alcohols can also be employed as modifiers for bulk polymerizations or vapor phase polymerizations. The vinyl content of the polybutadiene rubber made is controlled by the amount of modifier present during the polymerization.

In solution polymerizations, the inert organic medium which is utilized as the solvent will typically be a hydrocarbon which is liquid at ambient temperatures which can be one or more aromatic, paraffinic or cycloparaffinic compounds. These solvents will normally contain from 4 to 10 carbon atoms per molecule and will be liquids under the conditions of the polymerization. It is, of course, important for the solvent selected to be inert. The term "inert" as used herein means that the solvent does not interfere with the polymerization reaction or react with the polymers made thereby. Some representative examples of suitable organic solvents include pentane, isooctane, cyclohexane, normal hexane, benzene, toluene, xylene, ethylbenzene and the like, alone or in admixture. Saturated aliphatic solvents, such as cyclohexane and normal hexane, are most preferred.

The lithium catalysts which can be used are typically organolithium compounds. The organolithium compounds which are preferred can be represented by the formula R-Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium and 4-cyclohexylbutyllithium. Organo monolithium compounds, such as alkyllithium compounds and aryllithium compounds, are usually employed. Some representative examples of preferred organo monolithium compounds that can be utilized include ethylaluminum, isopropylaluminum, n-butyllithium, secondary-butyllithium, normal-hexyllithium, tertiary-octyllithium, phenyllithium, 2-napthyllithium, 4-butylphenyllithium, 4-phenylbutyllithium, cyclohexyllithium, and the like. Normal-butyllithium and secondary-butyllithium are highly preferred lithium initiators.

The amount of lithium catalyst utilized will vary from one organolithium compound to another and with the molecular weight that is desired for the high vinyl polybutadiene rubber being synthesized. As a general rule in all anionic polymerizations, the molecular weight (Mooney viscosity) of the polymer produced is inversely proportional to the amount of catalyst utilized. As a general rule, from about 0.01 phm (parts per hundred parts by weight of monomer) to 1 phm of the lithium catalyst will be employed. In most cases, from 0.01 phm to 0.1 phm of the lithium catalyst will be employed with it being preferred to utilize 0.025 phm to 0.07 phm of the lithium catalyst.

Normally, from about 5 weight percent to about 35 weight percent of the 1,3-butadiene monomer will be charged into the polymerization medium (based upon the total weight of the polymerization medium including the organic solvent and monomer). In most cases, it will be preferred for the polymerization medium to contain from about 10 weight percent to about 30 weight percent monomer. It is typically more preferred for the polymerization medium to contain from about 20 weight percent to about 25 weight percent monomer.

The polymerization temperature will normally be within the range of about 5° C. to about 100° C. For practical reasons and to attain the desired microstructure, the polymerization temperature will preferably be within the range of about 40° C. to about 90° C. Polymerization temperatures within the range of about 60° C. to about 90° C. are most preferred. The microstructure of the high vinyl polybutadiene is somewhat dependent upon the polymerization temperature.

The polymerization is allowed to continue until essentially all of the 1,3-butadiene monomer has been exhausted. In other words, the polymerization is allowed to run to completion. Since a lithium catalyst is employed to polymerize the 1,3-butadiene monomer, a living polymer is produced. The living polymer synthesized will have a number average molecular weight which is within the range of about 25,000 to about 700,000. The rubber synthesized will more typically have a number average molecular weight which is within the range of about 150,000 to about 400,000.

To increase the level of vinyl content, the polymerization is carried out in the presence of at least one polar modifier. Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine and the like.

The modifier can also be a 1,2,3-trialkoxybenzene or a 1,2,4-trialkoxybenzene. Some representative examples of 1,2,3-trialkoxybenzenes that can be used include 1,2,3-trimethoxybenzene, 1,2,3-triethoxybenzene, 1,2,3-tributoxybenzene, 1,2,3-trihexoxybenzene, 4,5,6-trimethyl-1,2,3-trimethoxybenzene, 4,5,6-tri-n-pentyl-1,2,3-triethoxybenzene, 5-methyl-1,2,3-trimethoxybenzene and 5-propyl-1,2,3-trimethoxybenzene. Some representative examples of 1,2,4-trialkoxybenzenes that can be used include 1,2,4-trimethoxybenzene, 1,2,4-triethoxybenzene, 1,2,4-tributoxybenzene, 1,2,4-tripentoxybenzene, 3,5,6-trimethyl-1,2,4-trimethoxybenzene, 5-propyl-1,2,4-trimethoxybenzene, and 3,5-dimethyl-1,2,4-trimethoxybenzene. Dipiperidinoethane, dipyrrolidinoethane, tetramethylethylene diamine, diethylene glycol, dimethyl ether and tetrahydrofuran are representative of highly preferred modifiers. U.S. Pat. No. 4,022,959 describes the use of ethers and tertiary amines as polar modifiers in greater detail.

The utilization of 1,2,3-trialkoxybenzenes and 1,2,4-trialkoxybenzenes as modifiers is described in greater detail in U.S. Pat. No. 4,696,986. The teachings of U.S. Pat. No. 4,022,959 and U.S. Pat. No. 4,696,986 are incorporated herein by reference in their entirety. The microstructure of the repeat units which are derived from butadiene monomer is a function of the polymerization temperature and the amount of polar modifier present. For example, it is known that higher temperatures result in lower vinyl contents (lower levels of 1,2-microstructure). Accordingly, the polymerization temperature, quantity of modifier and specific modifier selected will be determined with the ultimate desired microstructure of the polybutadiene rubber being synthesized being kept in mind.

It has been found that a combination of a metal salt of a cyclic alcohol and a polar modifier act synergistically to increase the vinyl content of rubbery polymer synthesized in their presence. The utilization of this synergistic modifier system can also be employed advantageously in the synthesis of the high vinyl polybutadiene rubber.

The metal salt of the cyclic alcohol will typically be a Group Ia metal salt. Lithium, sodium, potassium, rubidium, and cesium salts are representative examples of such salts with lithium, sodium and potassium salts being preferred. Sodium salts are typically the most preferred. The cyclic alcohol can be mono-cyclic, bi-cyclic or tri-cyclic and can be aliphatic or aromatic. They can be substituted with 1 to 5 hydrocarbon moieties and can also optionally contain hetero-atoms. For instance, the metal salt of the cyclic alcohol can be a metal salt of a di-alkylated cyclohexanol, such as 2-isopropyl-5-methylcyclohexanol or 2-t-butyl-5-methylcyclohexanol. These salts are preferred because they are soluble in hexane. Metal salts of disubstituted cyclohexanol are highly preferred because they are soluble in hexane and provide similar modification efficiencies to sodium t-amylate. Sodium mentholate is the most highly preferred metal salt of a cyclic alcohol that can be employed in the practice of this invention. Metal salts of thymol can also be utilized. The metal salt of the cyclic alcohol can be prepared by reacting the cyclic alcohol directly with the metal or another metal source, such as sodium hydride, in an aliphatic or aromatic solvent.

The molar ratio of the metal salt of the cyclic alcohol to the polar modifier will normally be within the range of about 0.1:1 to about 10:1 and the molar ratio of the metal salt of the cyclic alcohol to the lithium initiator will normally be within the range of about 0.01:1 to about 20:1. It is generally preferred for the molar ratio of the metal salt of the cyclic alcohol to the polar modifier to be within the range of about 0.2:1 to about 5:1 and for the molar ratio of the metal salt of the cyclic alcohol to the lithium initiator to be within the range of about 0.05:1 to about 10:1. It is generally more preferred for the molar ratio of the metal salt of the cyclic alcohol to the polar modifier to be within the range of about 0.5:1 to about 1:1 and for the molar ratio of the metal salt of the cyclic alcohol to the lithium initiator to be within the range of about 0.2:1 to about 3:1.

After the polymerization has been completed, the living high vinyl polybutadiene rubber can optionally be coupled with a suitable coupling agent, such as a tin tetrahalide or a silicon tetrahalide. The high vinyl polybutadiene rubber is then recovered from the organic solvent. The high vinyl polybutadiene rubber can be recovered from the organic solvent and residue by any means, such as decantation, filtration, centrification and the like. It is often desirable to precipitate the high vinyl polybutadiene rubber from the organic solvent by the addition of lower alcohols containing from about 1 to about 4 carbon atoms to the polymer solution. Suitable lower alcohols for precipitation of the high vinyl polybutadiene rubber from the polymer cement include methanol, ethanol, isopropyl alcohol, normal-propyl alcohol and t-butyl alcohol. The utilization of lower alcohols to precipitate the high vinyl polybutadiene rubber from the polymer cement also "kills" the living polymer by inactivating lithium end groups. After the high vinyl polybutadiene rubber is recovered from the solution, steam-stripping can be employed to reduce the level of volatile organic compounds in the polymer. The inert solvent and residual monomer can then be recycled for subsequent polymerization.

Synthesis of the Tin-Coupled Isoprene-Butadiene Rubber

The tin-coupled isoprene-butadiene rubber will typically have a Mooney ML 1+4 viscosity which is within the range of about 5 to about 40 before coupling and a Mooney ML 1+4 viscosity of about 60 to about 120 after coupling. The tin-coupled isoprene-butadiene rubber will preferably have a Mooney ML 1+4 viscosity which is within the range of about 5 to about 35 before coupling and a Mooney ML 1+4 viscosity of about 75 to about 110 after coupling. The tin-coupled isoprene-butadiene will most preferably have a Mooney ML 1+4 viscosity which is within the range of about 10 to about 30 before coupling and a Mooney ML 1+4 viscosity of about 80 to about 100 after coupling.

The tin-coupled isoprene-butadiene rubber will typically be prepared by reacting "living" isoprene-butadiene rubber having lithium end groups with a tin halide, such as tin tetrachloride. This coupling step will normally be carried out as a batch process. However, it is generally preferred to tin-couple the isoprene-butadiene rubber in a continuous process which results in the formation of asymmetrically tin-coupled isoprene-butadiene rubber. A technique for producing asymmetrically tin-coupled isoprene-butadiene rubber is disclosed in U.S. Pat. No. 6,043,321, The teachings of U.S. Pat. No. 6,043,321 are hereby incorporated herein by reference in their entirety.

The tin coupling agent employed in making asymmetrically tin-coupled isoprene-butadiene rubber will normally be a tin tetrahalide, such as tin tetrachloride, tin tetrabromide, tin tetrafluoride or tin tetraiodide. However, tin trihalides can also optionally be used. In cases where tin trihalides are utilized, a coupled polymer having a maximum of three arms results. To induce a higher level of branching, tin tetrahalides are normally preferred. As a general rule, tin tetrachloride is most preferred.

Broadly, and exemplary, a range of about 0.01 to 4.5 milliequivalents of tin coupling agent is employed per 100 grams of the rubbery polymer. It is normally preferred to utilize about 0.01 to about 1.5 milliequivalents of the tin coupling agent per 100 grams of polymer to obtain the desired Mooney viscosity. The larger quantities tend to result in production of polymers containing terminally reactive groups or insufficient: coupling. One equivalent of tin coupling agent per equivalent of lithium is considered an optimum amount for maximum branching. For instance, if a tin tetrahalide is used as the coupling agent, one mole of the tin tetrahalide would be utilized per four moles of live lithium ends. In cases where a tin trihalide is used as the coupling agent, one mole of the tin trihalide will optimally be utilized for every three moles of live lithium ends. The tin coupling agent can be added in a hydrocarbon solution (e.g., in cyclohexane) to the polymerization admixture in the reactor with suitable mixing for distribution and reaction.

After the tin coupling has been completed, a tertiary chelating alkyl 1,2-ethylene diamine can optionally be added to the polymer cement to stabilize the tin-coupled rubbery polymer. This technique for stabilization of the tin-coupled rubber is more fully described in U.S. Pat. No. 5,739,182. The teachings of U.S. Pat. No. 5,739,182 are incorporated herein by reference in their entirety. The tertiary chelating amines which can be used for stabilization are normally chelating alkyl diamines of the structural formula:

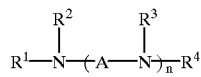

wherein n represents an integer from 1 to about 6, wherein A represents an alkane group containing from 1 to about 6 carbon atoms and wherein $R^1$, $R^2$, $R^3$ and $R^4$ can be the same or different and represent alkane groups containing from 1 to about 6 carbon atoms. The alkane group A is the formula $-(-CH_2-)_m$ wherein m is an integer from 1 to about 6. The alkane group will typically contain from 1 to 4 carbon atoms (m will be 1 to 4) and will preferably contain 2 carbon atoms. In most cases, n will be an integer from 1 to about 3 with it being preferred for n to be 1. It is preferred for $R^1$, $R^2$, $R^3$ and $R^4$ to represent alkane groups which contain from 1 to 3 carbon atoms. In most cases, $R^1$, $R^2$, $R^3$ and $R^4$ will represent methyl groups.

A sufficient amount of the chelating amine should be added to complex with any residual tin coupling agent remaining after completion of the coupling reaction. In most cases, from about 0.01 phr (parts by weight per 100 parts by weight of dry rubber) to about 2 phr of the chelating alkyl 1,2-ethylene diamine will be added to the polymer cement to stabilize the rubbery polymer. Typically, from about 0.05 phr to about 1 phr of the chelating alkyl 1,2-ethylene diamine will be added. More typically, from about 0.1 phr to about 0.6 phr of the chelating alkyl 1,2-ethylene diamine will be added to the polymer cement to stabilize the rubbery polymer.

After the polymerization, asymmetrical tin coupling and optionally the stabilization step has been completed, the tin-coupled isoprene-butadiene rubber can be recovered from the organic solvent utilized in the solution polymerization. The tin-coupled rubbery polymer can be recovered from the organic solvent and residue by means such as decantation, filtration, centrification and the like. It is often desirable to precipitate the tin-coupled rubbery polymer from the organic solvent by the addition of lower alcohols containing from about 1 to about 4 carbon atoms to the polymer solution. Suitable lower alcohols for precipitation of the rubber from the polymer cement include methanol, ethanol, isopropyl alcohol, normal-propyl alcohol and t-butyl alcohol. The utilization of lower alcohols to precipitate the tin-coupled rubbery polymer from the polymer cement also "kills" any remaining living polymer by inactivating lithium end groups. After the tin-coupled rubbery polymer is recovered from the solution, steam-stripping can be employed to reduce the level of volatile organic compounds in the tin-coupled rubbery polymer.

The asymmetrical tin-coupled isoprene-butadiene rubber that can be employed in the blends of this invention are comprised of a tin atom having at least three isoprene-butadiene arms covalently bonded thereto. At least one of the isoprene-butadiene arms bonded to the tin atom has a number average molecular weight of less than about 40,000 and at least one of the isoprene-butadiene arms bonded to the tin atom has a number average molecular weight of at least about 80,000. The ratio of the weight average molecular weight to the number average molecular weight of the asymmetrical tin-coupled isoprene-butadiene rubber will also normally be within the range of about 2 to about 2.5.

The asymmetrical tin-coupled isoprene-butadiene rubber that can be utilized in the blends of this invention is typically of the structural formula:

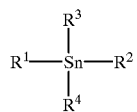

wherein $R^1$, $R^2$, $R^3$ and $R^4$ can be the same or different and are selected from the group consisting of alkyl groups and isoprene-butadiene arms (isoprene-butadiene rubber chains), with the proviso that at least three members selected from the group consisting of $R^1$, $R^2$, $R^3$ and $R^4$ are isoprene-butadiene arms, with the proviso that at least one member selected from the group consisting of $R^1$, $R^2$, $R^3$ and $R^4$ is a low molecular weight isoprene-butadiene arm having a number average molecular weight of less than about 40,000, with the proviso that at least one member selected from the group consisting of $R^1$, $R^2$, $R^3$ and $R^4$ is a high molecular weight isoprene-butadiene arm having a number average molecular weight of greater than about 80,000, and with the proviso that the ratio of the weight average molecular weight to the number average molecular weight of the asymmetrical tin-coupled isoprene-butadiene rubber is within the range of about 2 to about 2.5. It should be noted that $R^1$, $R^2$, $R^3$ and $R^4$ can be alkyl groups because it is possible for the tin halide coupling agent to react directly with alkyl lithium compounds which are used as the polymerization initiator.

In most cases, four isoprene-butadiene arms will be covalently bonded to the tin atom in the asymmetrical tin-coupled isoprene-butadiene rubber. In such cases, $R^1$, $R^2$, $R^3$ and $R^4$ will all be isoprene-butadiene arms. The asymmetrical tin-coupled isoprene-butadiene rubber will often contain an isoprene-butadiene arm of intermediate molecular weight as well as the low molecular weight arm and the high molecular weight arm. Such intermediate molecular weight arms will have a molecular weight which is within the range of about 45,000 to about 75,000. It is normally preferred for the low molecular isoprene-butadiene arm to have a molecular weight of less than about 30,000, with it being most preferred for the low molecular weight arm to have a molecular weight of less than about 25,000. It is normally preferred for the high molecular isoprene-butadiene arm to have a molecular weight of greater than about 90,000, with it being most preferred for the high molecular weight arm to have a molecular weight of greater than about 100,000.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

In this experiment, 2300 g of a silica/alumina/molecular sieve dried premix containing 11.0 weight percent 1,3-butadiene was charged into a one-gallon (3.8 liters) reactor. After the impurity of 1.5 ppm was determined, 7.42 ml of 1 M solution of N,N,N',N'-tetramethylethylene diamine (TMEDA) in hexanes, 0.21 ml of 1.12 M solution of sodium mentholate (SMT) in hexanes and 1.1 ml of a 1.03 M solution of n-butyllithium (n-BuLi) in hexanes (0.9 ml for initiation and 0.2 ml for scavenging the premix) were added to the reactor. The molar ratio of SMT to TMEDA and to n-BuLi was 0.25:8:1.

The polymerization was carried out at 65° C. for 10 minutes. The GC analysis of the residual monomer contained in the polymerization mixture indicated that the polymerization was complete at this time. Then one ml of 1 M ethanol solution in hexanes was added to shortstop the polymerization and polymer was removed from the reactor and stabilized with 1 phm of antioxidant. After evaporating hexanes, the resulting polymer was dried in a vacuum oven at 50° C.

The high vinyl polybutadiene produced was determined to have a glass transition temperature (Tg) at −25° C. It was then determined to have a microstructure which contained 85 percent 1,2-polybutadiene units and 15 percent 1,4-polybutadiene units. The Mooney ML-4 viscosity at 100° C. was 83 for this polybutadiene.

EXAMPLES 2–8

The procedure described in Example 1 was utilized in these examples except that the SMT/TMEDA/n-BuLi ratio was varied. The Tgs and ML-4s of the resulting polybutadienes are listed in Table I.

TABLE I

| Example | SMT/TMEDS/n-BuLi Ratio | Tg (° C.) | ML-4 |
|---|---|---|---|
| 1 | 0.25:8:1 | −25.4 | 83 |
| 2 | 0.25:5:1 | −26.9 | 81 |
| 3 | 0.25:3:1 | −28.9 | 87 |
| 4 | 0.25:1:1 | −35.6 | 88 |
| 5 | 0.25:0.5:1 | −49.2 | 88 |
| 6 | 0.15:3:1 | −26.9 | |
| 7 | 0.5:3:1 | −26.5 | 81 |
| 8 | 1:3:1 | −26.1 | |

EXAMPLE 9 AND COMPARATIVE EXAMPLE 10

In this experiment, a tire tread compound was made by blending 20 phr of natural rubber, 40 phr of high vinyl polybutadiene rubber, 40 phr of tin-coupled isoprene-butadiene rubber, 70 phr of silica, 11 phr of processing oil and 11 phr of a 50 percent/50 percent mixture of Si-69 silica coupling agent and carbon black. It was cured and physical properties were determined and compared to a control compound (Comparative Example 10) that contained 30 phr of Budene® 1207 high cis-1,4-polybutadiene rubber, 70 phr of solution SBR having a glass transition temperature of −43° C., 70 phr of silica, 11 phr processing oil and 11 phr of a 50 percent/50 percent mixture of Si-69 silica coupling agent and carbon black. The physical properties of the blends are shown in Table II.

TABLE II

| | Ex. 9 | Comp Ex. 10 |
|---|---|---|
| high-cis-1,4-PBD | — | 30 |
| solution SBR | — | 70 |
| natural rubber | 20 | — |
| high vinyl PBD | 40 | — |
| tin coupled IBR | 40 | — |
| silica | 70 | 70 |
| processing oil | 11 | 11 |
| silica coupling agent/carbon black blend | 11 | 11 |
| Zwick Rebound @ 0° C. | 21.0 | 26.2 |
| Zwick Rebound @ 100° C. | 65.4 | 65.2 |
| RPA - tan delta @ 100° C. & .333 Hz | 0.111 | 0.113 |
| DIN abrasion | 89/71 | 88/76 |

TABLE II-continued

|  | Ex. 9 | Comp Ex. 10 |
|---|---|---|
| RPA uncured 100° C. | 209 | 353 |
| Rheometer - min torque | 11 | 18 |

As can be seen from Table II, the tire tread formulation of this invention exhibited lower Zwick rebound at 0° C. than did the control which is indicative of better traction characteristics. By the same token, the tread formulation of this invention had a tan delta value at 100° C. which was comparable to that of the control which means that it would result in similar rolling resistance in a tire tread. Table II also shows that the tire tread formulation of this invention processed better than did the control formulation.

EXAMPLE 11 AND COMPARATIVE EXAMPLE 12

In this experiment, a second tire tread formulation was made and compared to a control compound. The compositions of the tire tread formulations made and their cured physical properties are shown in Table III.

TABLE III

|  | Ex. 11 | Comp Ex. 12 |
|---|---|---|
| solution SBR | — | 70 |
| Budene ® 1207 high cis-1,4-PBD | — | 30 |
| natural rubber | 40 | — |
| high vinyl PBD | 30 | — |
| tin coupled IBR | 30 | — |
| silica | 70 | 70 |
| processing oil | 28 | 28 |
| silica coupling agent/carbon black blend | 11 | 11 |
| N-(1,3-dimethyl butyl)-N'-phenyl-p-phenylene diamine | 1 | 1 |
| polymerized 1,2-dihydro-2,2,4-trimethylquinoline | 1 | 1 |
| microcrystalline wax | 2.5 | 2.5 |
| refined paraffin wax | 1 | 1 |
| zinc oxide | 3.5 | 3.5 |
| stearic acid | 1.5 | 1.5 |
| untreated symmetrical diphenylguanidine | 2 | 2 |
| N-cyclohexyl benzothiazole-2-sulfenamide | 1.7 | 1.7 |
| rubber maker's sulfur | 1.4 | 1.4 |
| ATS 300% | 9.87 | 10.42 |
| Tensile Strength (MPa) | 16.02 | 15.97 |
| Elongation (%) | 449 | 428 |
| Hardness @ RT | 61 | 63 |
| Hardenss @ 100° C. | 56 | 59.5 |
| Rebound @ RT | 46.3 | 46.1 |
| Rebound @ 100° C. | 65.2 | 65 |
| Tan Delta 11 Hz 1% Strain |  |  |
| −40° C. | 0.6 | 0.51 |
| −30° C. | 0.58 | 0.46 |
| −20° C. | 0.40 | 0.31 |
| −10° C. | 0.28 | 0.22 |
| 0° C. | 0.20 | 0.18 |
| RPA 521 - G' 1% | 1794 | 2338 |
| RPA 521 - G' 14% | 1188 | 1439 |
| tan delta 5% | 0.111 | 0.113 |
| DIN Abrasion 10N | 88 | 96 |
| Zwick Rebound @ 0° C. | 20.2 | 24.6 |
| Rheometer @ 150° C. - ML | 7.5 | 12.5 |
| Rheometer @ 150° C. - MH | 34 | 40 |
| Delta Torque | 26.5 | 27.5 |
| T25 | 6.25 | 7 |
| T90 | 11 | 13.25 |

Table III shows an improvement in wet traction characteristics (rebound at 0° C. and low temperature tan delta values) as compared to the control made with the solution SBR. This data also suggests equal rolling resistance characteristics (rebound at 100° C. and tan delta at 100° C.) as compared to the control. The tire tread formulation of this invention made in Example 11 also offered significant improvements in processing (much lower ML values) than the control formulation made with the solution SBR.

Variations in the present invention are possible in light of the description of it provided herein. It is, therefore, to be understood that changes can be made in the particular embodiments described which will be within the full intended scope of the invention as defined by the following appended claims.

What is claimed is:

1. A tire which is comprised of a generally toroidal-shaped carcass with an outer circumferential tread, two spaced beads, at least one ply extending from bead to bead and sidewalls extending radially from and connecting said tread to said beads; wherein said tread is adapted to be ground-contacting; wherein the tread is comprised of (1) 5 phr to 40 phr of a polyisoprene rubber selected from the group consisting of natural rubber and synthetic polyisoprene, (2) 20 phr to 60 phr of high vinyl polybutadiene rubber having a glass transition temperature which is within the range of −40° C. to 10° C., (3) 20 phr to 60 phr of tin-coupled isoprene-butadiene rubber having a glass transition temperature which is within the range of −90° C. to −70° C., wherein the tin-coupled isoprene-butadiene rubber is comprised of a tin atom having at least 3 isoprene-butadiene arms covalently bonded thereto, and wherein the isoprene-butadiene arms consist of isoprene-butadiene chains, (4) 30 phr to 90 phr of silica, (5) 5 phr to 50 phr of carbon black, (6) 2 phr to 50 phr of processing oil and (7) 0.5 phr to 15 phr of a silica coupling agent.

2. A tire as specified in claim 1 wherein the tread contains 10 phr to 30 phr of the polyisoprene rubber, 30 phr to 50 phr of high vinyl polybutadiene rubber and 30 phr to 50 phr of tin-coupled isoprene-butadiene rubber.

3. A tire as specified in claim 2 wherein the polyisoprene rubber selected from the group consisting of natural rubber and synthetic polyisoprene is natural rubber.

4. A tire as specified in claim 2 wherein the polyisoprene rubber selected from the group consisting of natural rubber and synthetic polyisoprene is synthetic polyisoprene.

5. A tire as specified in claim 3 wherein the silica is present at a level which is within the range of 40 phr to 80 phr.

6. A tire as specified in claim 5 wherein the carbon black is present at a level which is within the range of 5 phr to 20 phr.

7. A tire as specified in claim 6 wherein the tread contains 15 phr to 20 phr of the polyisoprene rubber, 35 phr to 45 phr of high vinyl polybutadiene rubber and 35 phr to 45 phr of tin-coupled isoprene-butadiene rubber.

8. A tire as specified in claim 7 wherein the silica is present at a level which is within the range of 50 phr to 75 phr.

9. A tire as specified in claim 8 wherein the carbon black is present at a level which is within the range of 5 phr to 10 phr.

10. A tire as specified in claim 9 wherein the processing oil is present at a level which is within the range of 5 phr to 20 phr.

11. A rubber formulation which is comprised of (1) 5 phr to 40 phr of a polyisoprene rubber selected from the group consisting of natural rubber and synthetic polyisoprene, (2) 20 phr to 60 phr of high vinyl polybutadiene rubber having a glass transition temperature which is within the range of −40° C. to 10° C., (3) 20 phr to 60 phr of tin-coupled isoprene-butadiene rubber having a glass transition temperature which is within the range of −90° C. to −70° C., wherein the tin-coupled isoprene-butadiene rubber is comprised of a tin atom having at least 3 isoprene-butadiene arms covalently bonded thereto, and wherein the isoprene-butadiene arms consist of isoprene-butadiene chains, (4) 30 phr to 90 phr of silica, (5) 5 phr to 50 phr of carbon black, (6) 2 phr to 50 phr of processing oil and (7) 0.5 phr to 15 phr of a silica coupling agent.

12. A rubber formulation as specified in claim 11 wherein the tread contains 10 phr to 30 phr of the polyisoprene rubber, 30 phr to 50 phr of high vinyl polybutadiene rubber and 30 phr to 50 phr of tin-coupled isoprene-butadiene rubber.

13. A rubber formulation as specified in claim 12 wherein the polyisoprene rubber selected from the group consisting of natural rubber and synthetic polyisoprene is natural rubber.

14. A rubber formulation as specified in claim 12 wherein the polyisoprene rubber selected from the group consisting of natural rubber and synthetic polyisoprene is synthetic polyisoprene.

15. A rubber formulation as specified in claim 13 wherein the silica is present at a level which is within the range of 40 phr to 80 phr.

16. A rubber formulation as specified in claim 15 wherein the carbon black is present at a level which is within the range of 5 phr to 20 phr.

17. A rubber formulation as specified in claim 16 wherein the tread contains 15 phr to 20 phr of the polyisoprene rubber, 35 phr to 45 phr of high vinyl polybutadiene rubber and 35 phr to 45 phr of tin-coupled isoprene-butadiene rubber.

18. A rubber formulation as specified in claim 17 wherein the silica is present at a level which is within the range of 50 phr to 75 phr.

19. A rubber formulation as specified in claim 18 wherein the carbon black is present at a level which is within the range of 5 phr to 10 phr.

20. A rubber formulation as specified in claim 19 wherein the processing oil is present at a level which is within the range of 5 phr to 20 phr.

* * * * *